P. CAVALIER.
Rolling-Pin.
No. 159,643          Patented Feb. 9, 1875.
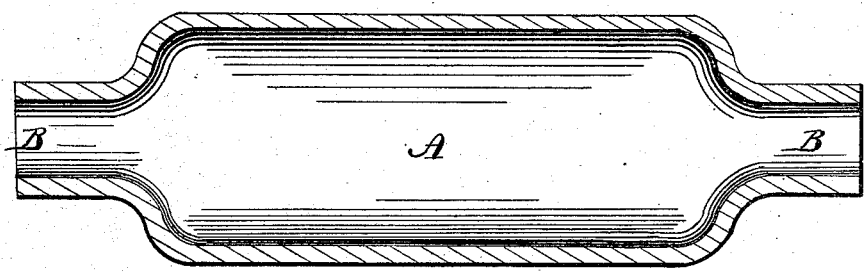

UNITED STATES PATENT OFFICE.

PETER CAVALIER, OF YANKTON, DAKOTA TERRITORY.

IMPROVEMENT IN ROLLING-PINS.

Specification forming part of Letters Patent No. 159,643, dated February 9, 1875; application filed July 29, 1874.

*To all whom it may concern:*

Be it known that I, PETER CAVALIER, of Yankton, in the county of Yankton and in the Territory of Dakota, have invented certain new and useful Improvements in Rolling-Pin; and do hereby declare that the following is a full, clear, and exact description thereof, reference being had to the accompanying drawings and to the letters of reference marked thereon, making a part of this specification.

The nature of my invention consists in a rolling-pin made of glass, as will be hereinafter more fully set forth.

In order to enable others skilled in the art to which my invention appertains to make and use the same, I will now proceed to describe its construction and operation, referring to the annexed drawing, which represents a longitudinal section of my rolling-pin.

A represents a rolling-pin of any suitable dimensions, provided with journals or handles B B, one at each end. The rolling-pin thus constructed is made of glass in one piece, which makes it much more easy to clean, and it does not stick to the dough, or the dough to it.

The rolling-pin is made hollow, as shown, so that it may be filled with hot or cold water, and the handles stopped up, so as to increase or decrease the temperature of the dough while working it.

Having thus fully described my invention, what I claim as new, and desire to secure by Letters Patent, is—

As an article of manufacture, a hollow rolling-pin, formed of a single piece of glass, with its two ends open, and contracted to form handles B B, as and for the purposes set forth.

In testimony that I claim the foregoing I have hereunto set my hand this 23d day of June, 1874.

PETER CAVALIER.

Witnesses:
G. T. ROUNDS,
S. H. GRUBER.